Aug. 17, 1937.   O. J. KUENHOLD   2,090,053
WARM AIR FURNACE STRUCTURE
Original Filed Oct. 7, 1933   8 Sheets-Sheet 1
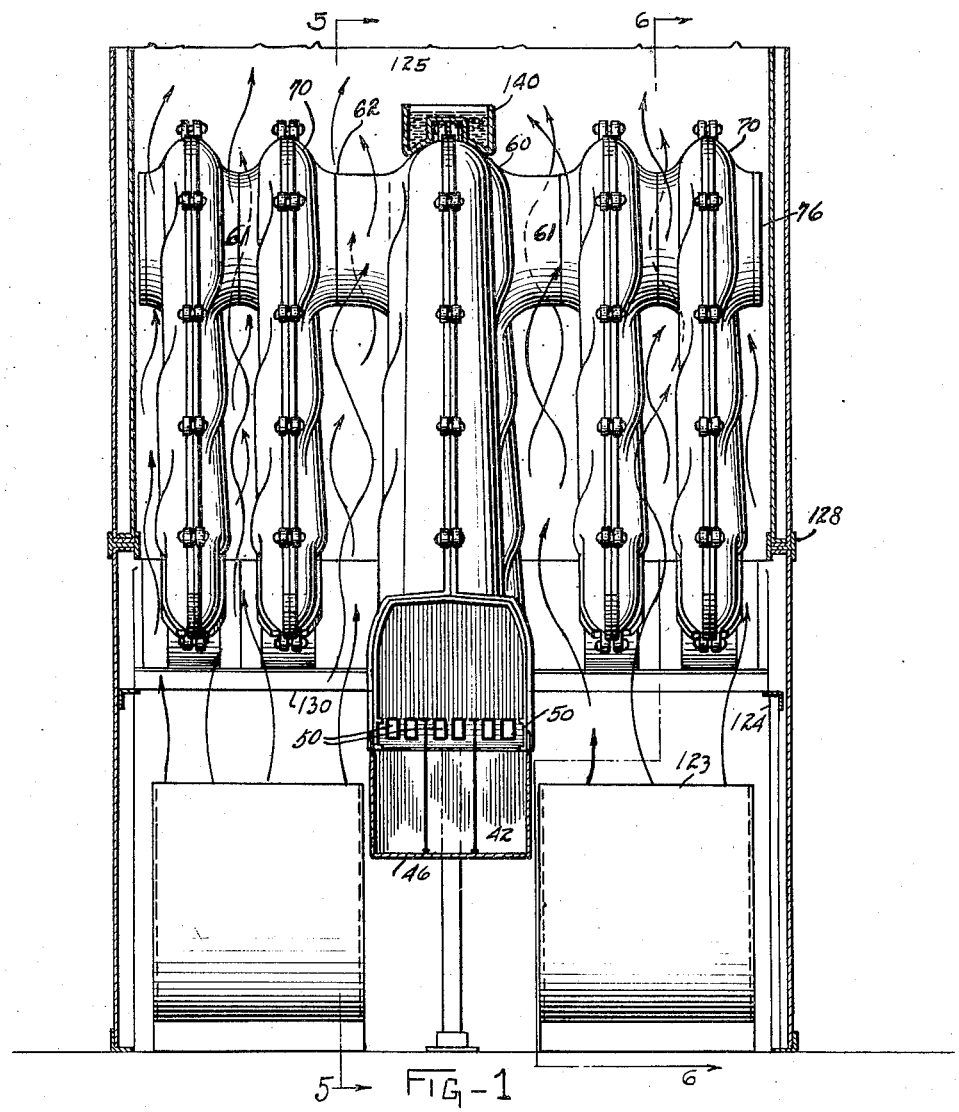
INVENTOR
OTTO J. KUENHOLD
BY
Brockett, Hyde, Higley & Meyer.
ATTORNEY

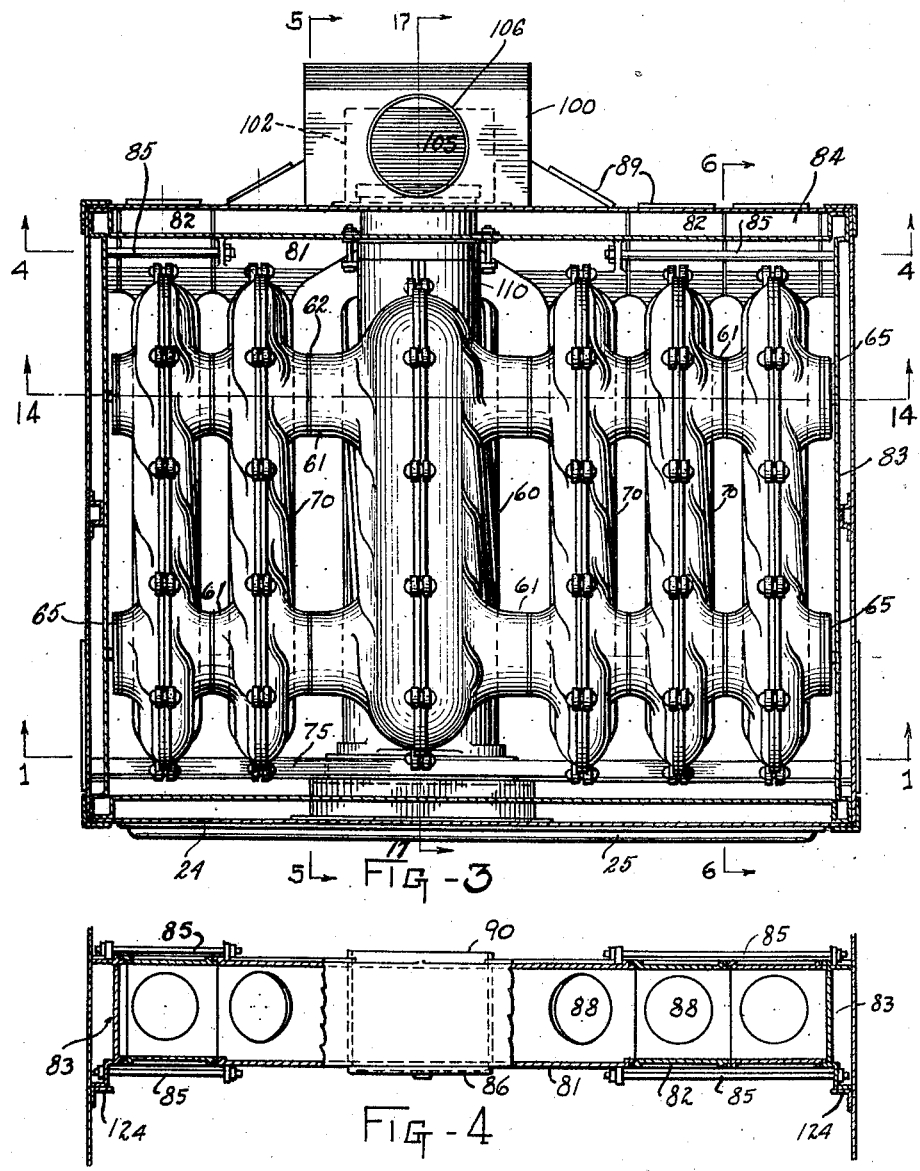

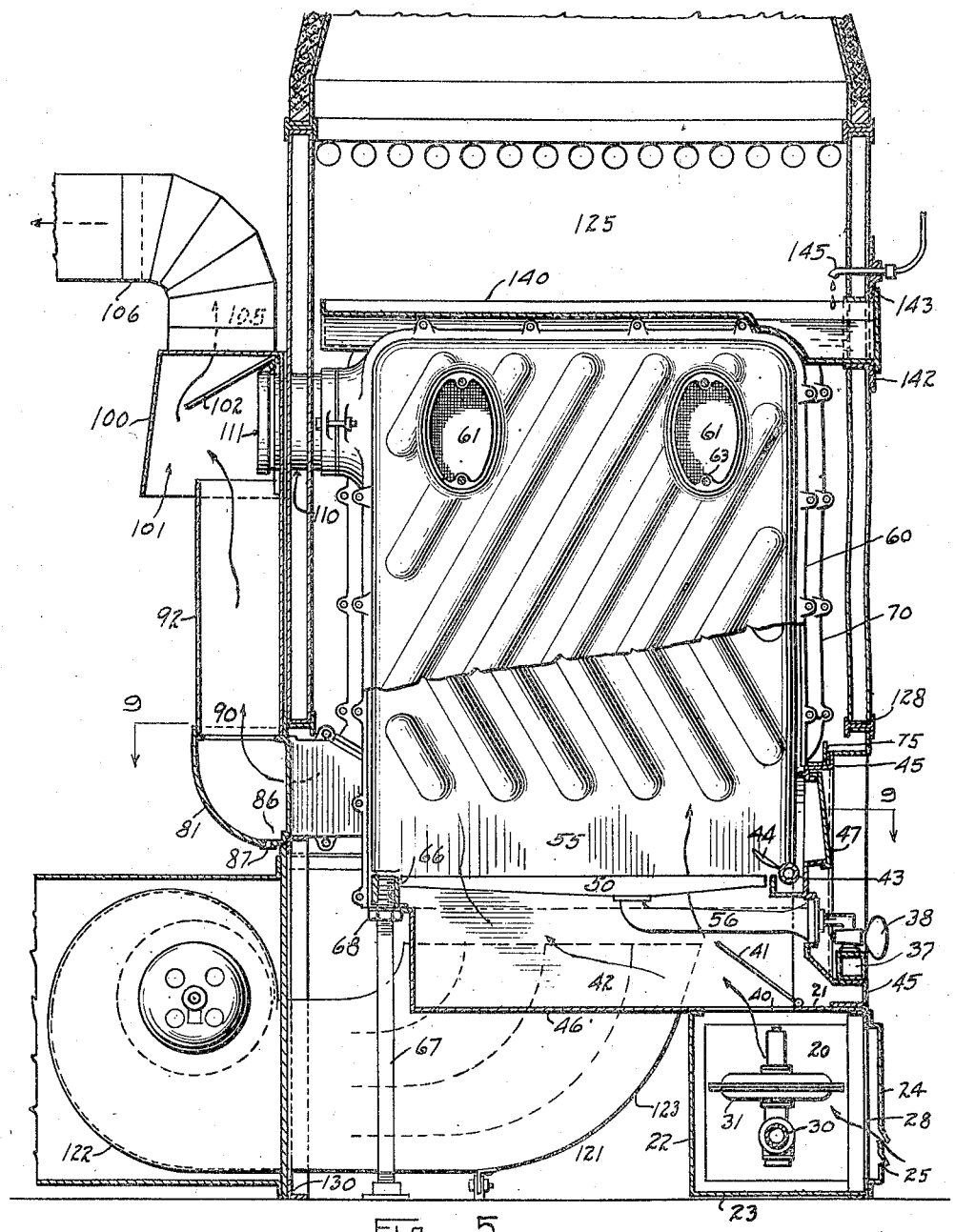

Aug. 17, 1937.  O. J. KUENHOLD  2,090,053
WARM AIR FURNACE STRUCTURE
Original Filed Oct. 7, 1933   8 Sheets-Sheet 4
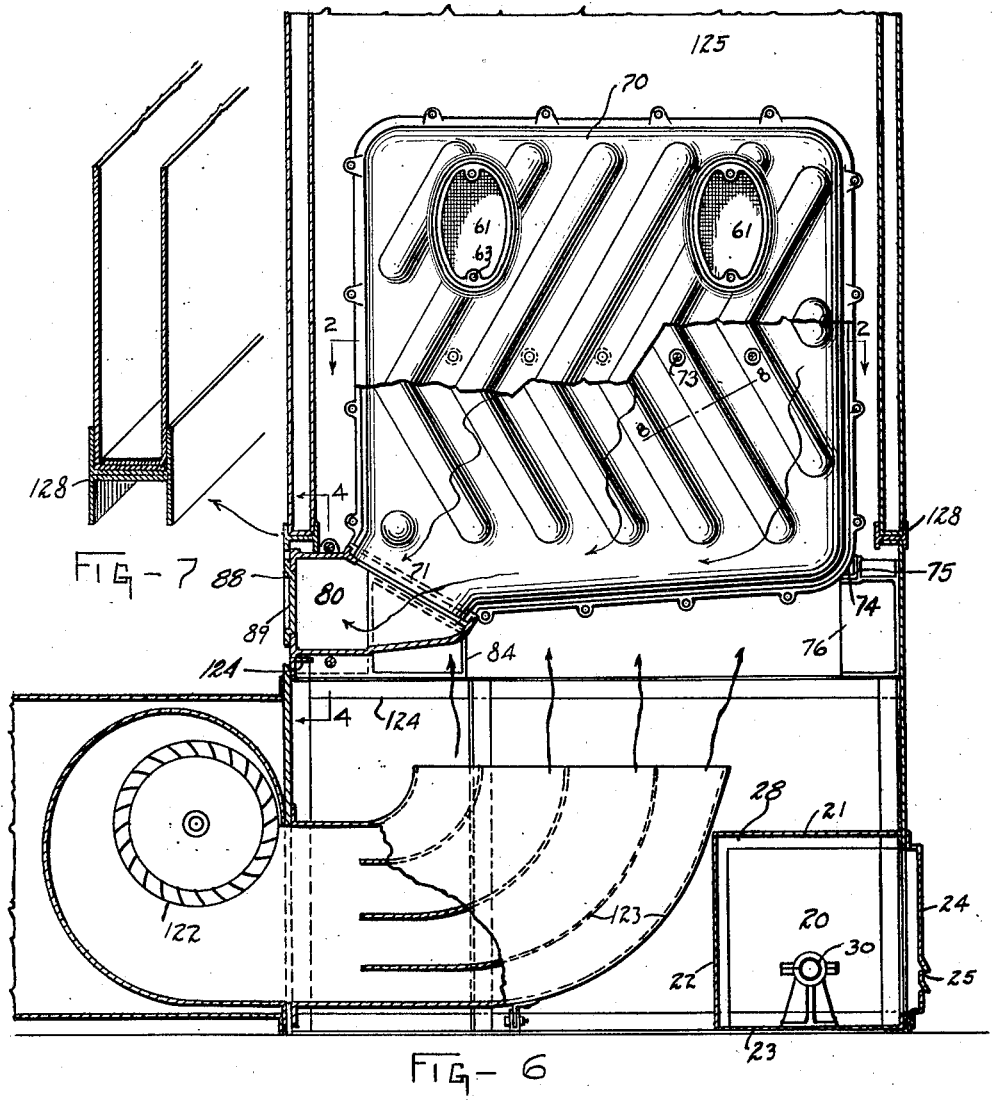
INVENTOR
OTTO J. KUENHOLD
BY
Brackett, Hyde, Higley + Meyer
ATTORNEYS Aug. 17, 1937.     O. J. KUENHOLD     2,090,053
WARM AIR FURNACE STRUCTURE
Original Filed Oct. 7, 1933     8 Sheets-Sheet 5
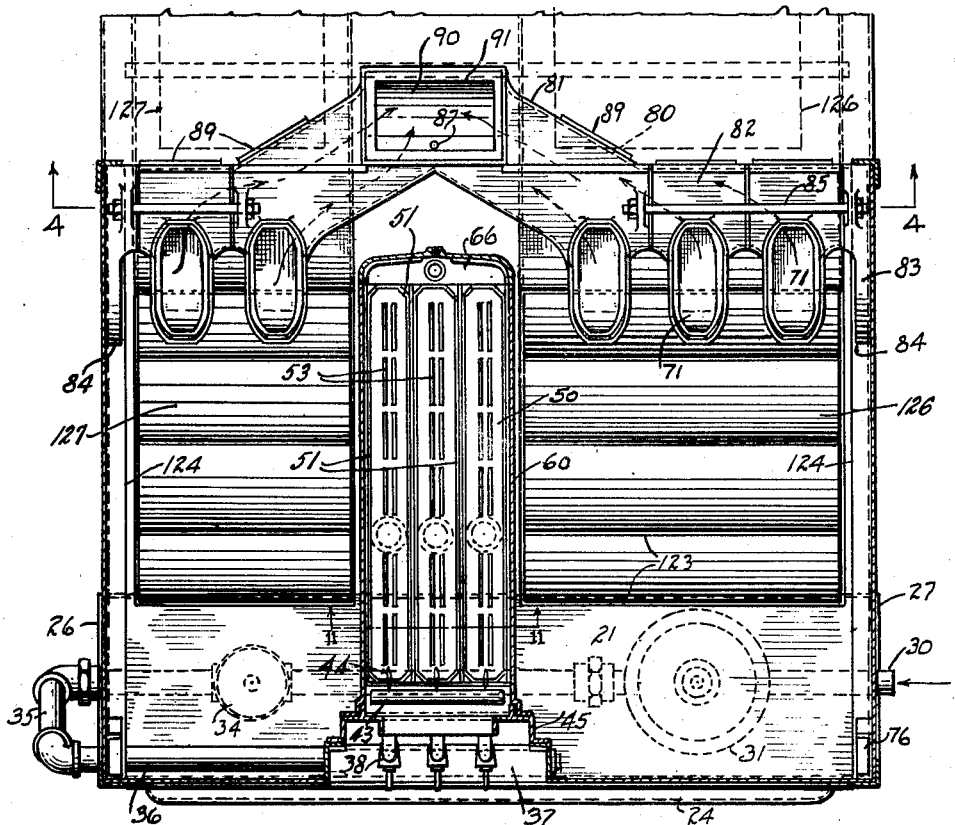
Fig-9
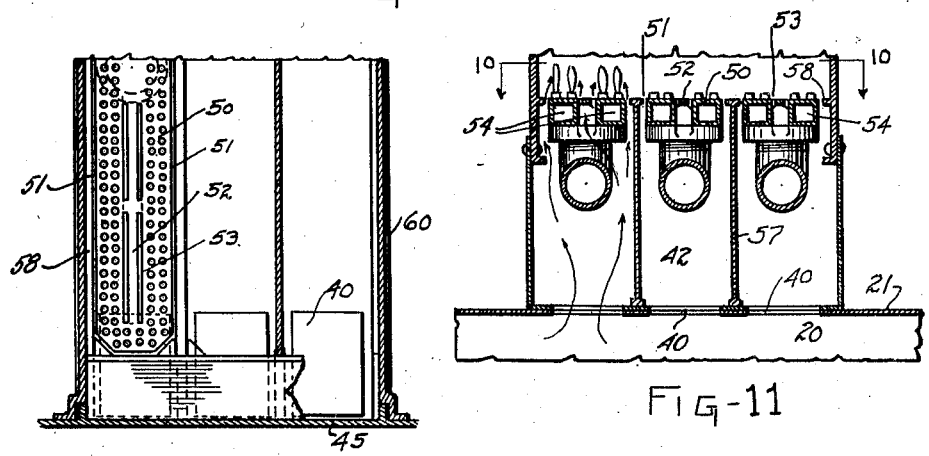
Fig-10
Fig-11
INVENTOR
OTTO J. KUENHOLD.
BY
ATTORNEYS.

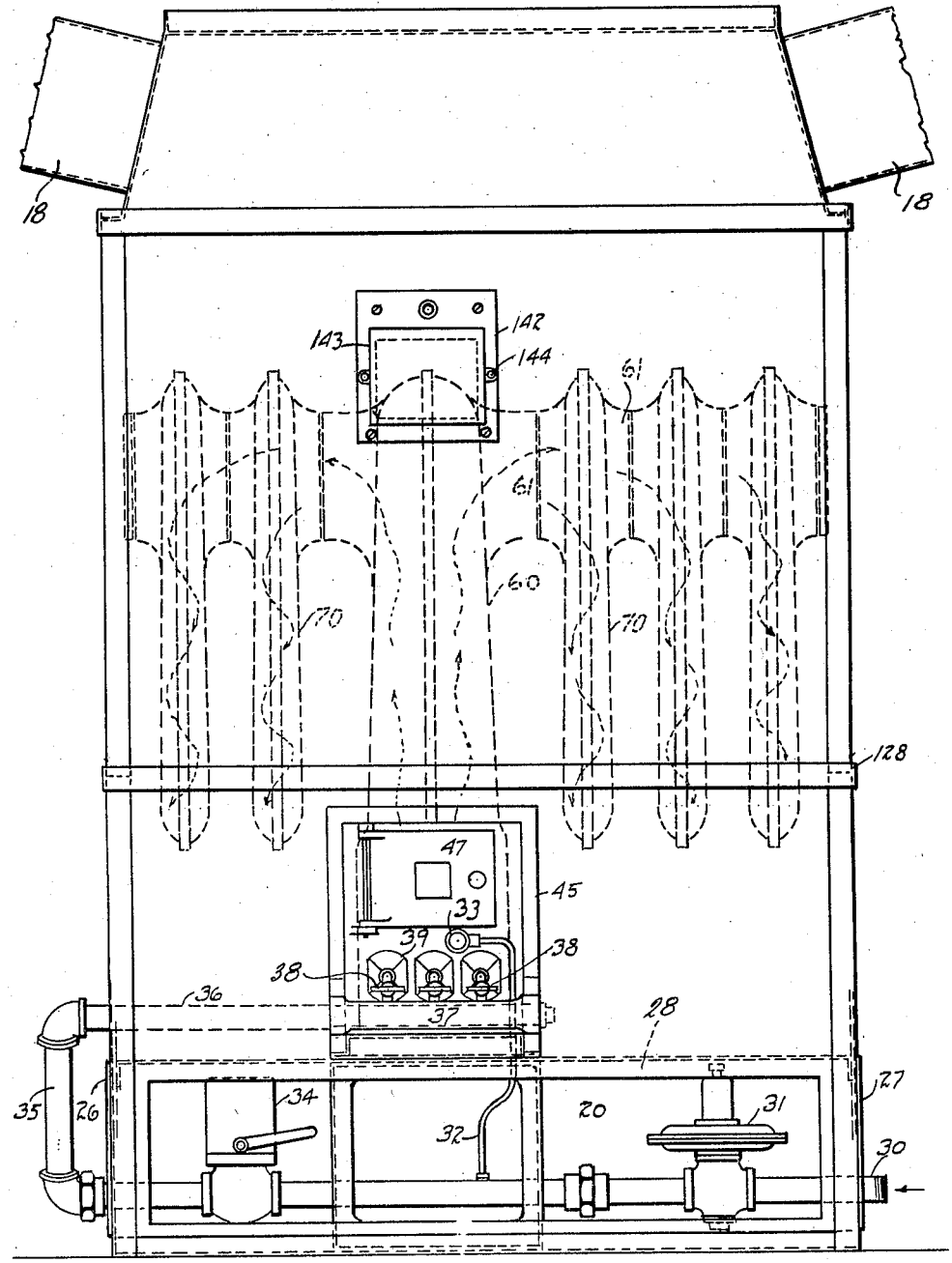

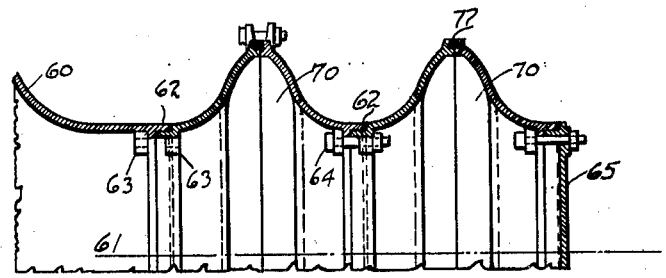
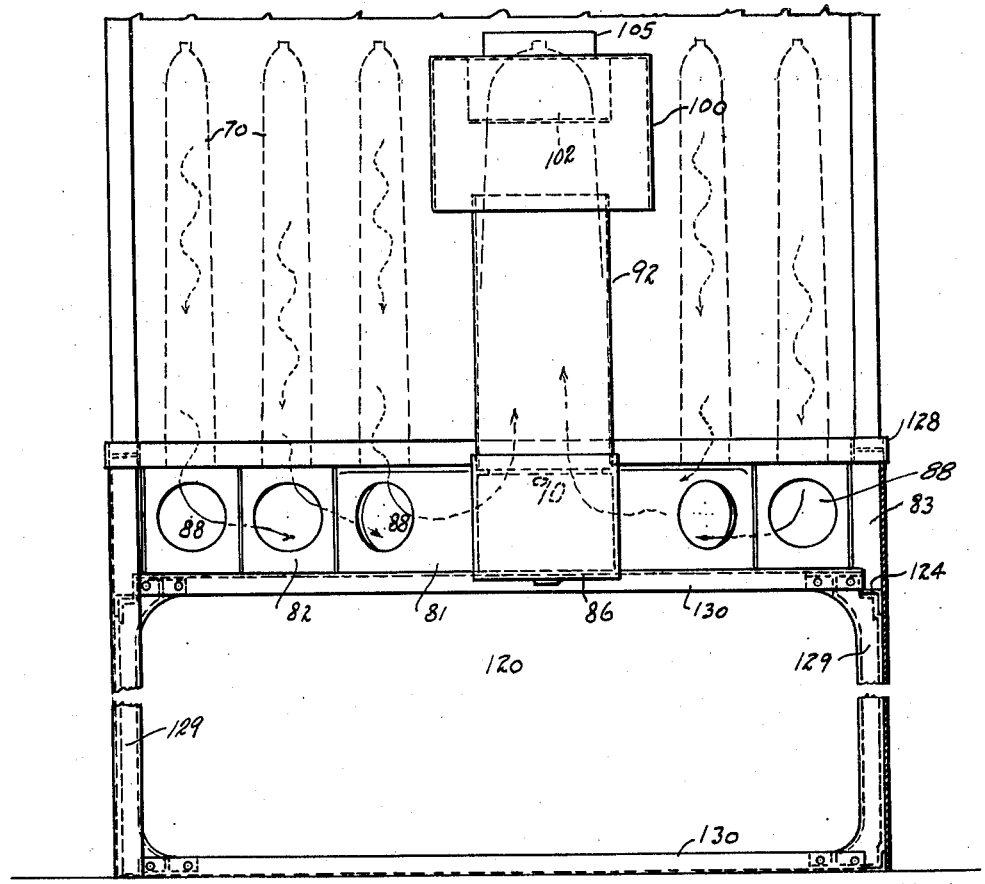

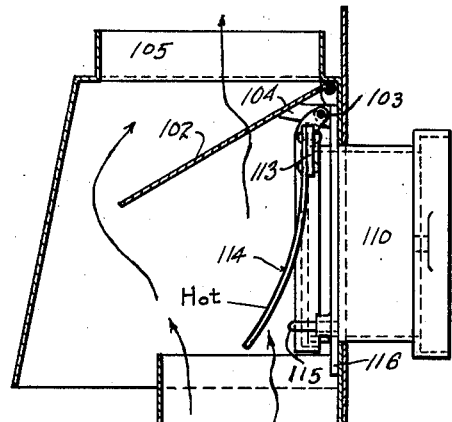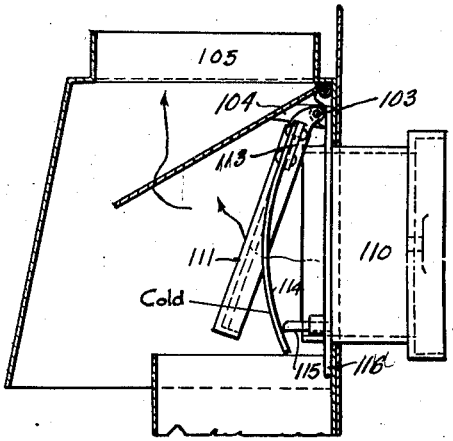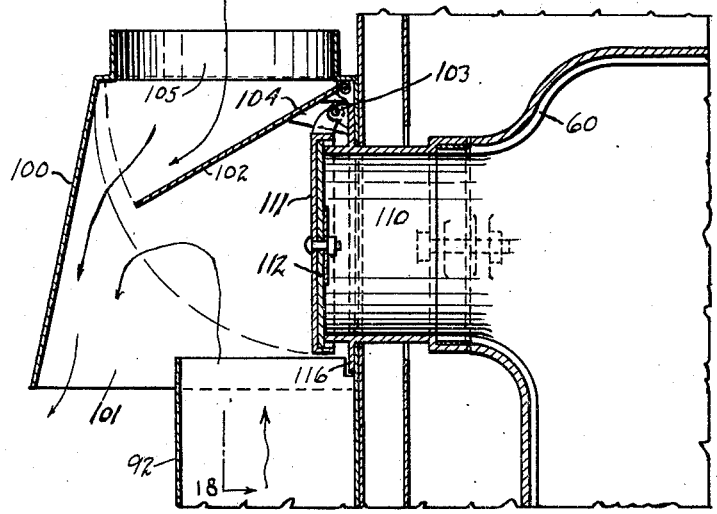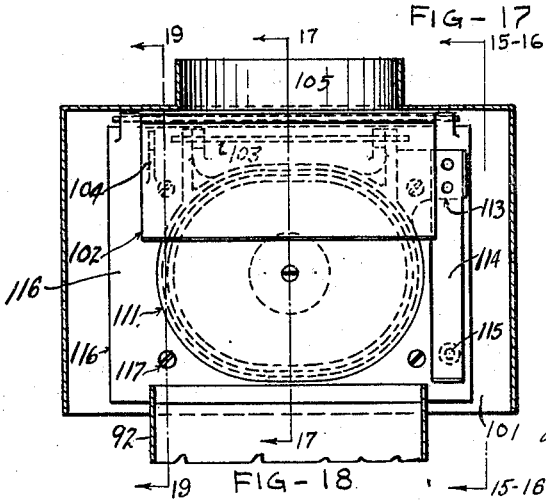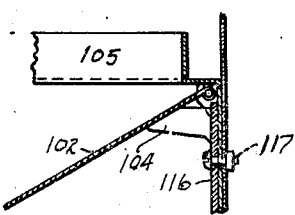

Patented Aug. 17, 1937

2,090,053

UNITED STATES PATENT OFFICE 2,090,053

WARM AIR FURNACE STRUCTURE

Otto J. Kuenhold, Shaker Heights, Ohio, assignor to The Forest City Foundries Company, Cleveland, Ohio, a corporation of Ohio Application October 7, 1933, Serial No. 692,690
Renewed January 27, 1937

7 Claims. (Cl. 126—116)

This invention relates to improvements in furnaces for warm air circulating systems, and has for its general objects the provision of an improved warm air furnace which has exceptionally high thermal efficiency, free air flow therethrough, equal distribution of heat into all warm air outlet ducts connected therewith, a neat and compact appearance and maximum safety of operation in use.

A further object of the present invention is the provision of an improved warm air furnace having smoothness and dependability of operation, simplicity and economy of production, ease of shipment and erection, and which is capable of manufacture in a large range of sizes from a minimum number of foundry patterns.

With the foregoing and other objects in view which will appear as the description of the invention proceeds, the invention resides in the combination and arrangement of parts and in the details of construction hereinafter described and claimed, it being understood that changes in the invention as herein disclosed can be made within the scope of what is claimed without departing from the spirit of the invention.

The present invention will be readily understood from the following description thereof, reference being had to the accompanying drawings in which Fig. 1 is a vertical, longitudinal sectional view of a furnace constructed in accordance with one embodiment of the invention, the view being in the plane of line 1—1, Fig. 3; Fig. 2 is a detail cross-sectional view of a portion of one of the side or auxiliary heat convectors of the furnace, the view being in the plane of the line 2—2, Fig. 6; Fig. 3 is a horizontal sectional view of a furnace constructed in accordance with another embodiment of the present invention, there being in this view an unbalanced arrangement of side or auxiliary heat convectors, three on one side and two on the other side of the central or main heat convector, whereas in Fig. 1 there is a balanced arrangement of side or auxiliary heat convectors, there being two on each side of the central or main heat convector; Fig. 4 is a detail vertical sectional view of the vent manifold for the side or auxiliary heat convectors, the view being in the plane of line 4—4, Fig. 6; Fig. 5 is a vertical, transverse sectional view of the furnace, the view being in the plane of line 5—5, Fig. 1; Fig. 6 is a similar view, in the plane of line 6—6, Fig. 1; Fig. 7 is a detail perspective view of a portion of the furnace casing at the horizontal junction of the upper and lower parts thereof; Fig. 8 is a transverse section through a side wall of one of the heat convectors, the view being in the plane of line 8—8, Fig. 6; Fig. 9 is a horizontal sectional view of the furnace, with the side or auxiliary heat convectors removed, the view being in the plane of line 9—9, Fig. 5; Fig. 10 is a detail horizontal sectional view through the combustion chamber of the furnace, with two of the three burners removed, the view being in the plane of line 10—10, Fig. 11; Fig. 11 is a detail vertical sectional view of said burners, the view being in the plane of line 11—11, Fig. 9; Fig. 12 is a front elevation of the furnace with the front door of the control chamber removed; Fig. 13 is a rear elevation of the lower portion of the furnace, with a portion of the casing at one side in section; Fig. 14 is an enlarged vertical transverse sectional view showing the assembly of the heat convector sections at their upper junctions, the view being in the plane of line 14—14, Fig. 3; and Figs. 15 to 19 inclusive are enlarged sectional views of the draft hood and the explosion relief means associated therewith; Figs. 15 and 16 being vertical sectional views on the line 15—16—15—16, Fig. 18; Fig. 17 being a vertical sectional view on the line 17—17, Fig. 18; Fig. 18 being a vertical sectional view on the line 18—18, Fig. 17; and Fig. 19 being a vertical sectional view on the line 19—19, Fig. 18.

In its general aspects, the present furnace includes a battery of generally parallel and generally vertically disposed heat convectors 60, 70 through which flow the heated products of combustion and between and around which flow the air to be heated.

In the main and central heat convector 60 are located the fuel burners of the furnace, there being three gas burners 50 in the embodiment of the invention here shown. Combustion is completed in the liberal sized combustion compartment 55 of the main convector and the burned gases rise or flow upwardly directly to the top of said convector, from which they pass laterally into the top cross passages 61 and are distributed thereby into the side or auxiliary heat convectors 70. In these side or auxiliary convectors, the gases are gradually cooled by the upwardly flowing air surrounding said convectors and as the gases cool they contract, become heavier and gradually gravitate downwardly toward the auxiliary convector outlets 71 at the lower ends thereof. Said outlets communicate with a common, transversely and generally horizontally disposed vent manifold 80 into which the cooled gases drop and then, as shown by the arrows in Fig. 9, they pass to and through the manifold's vent outlet 90 into and through the generally vertically disposed vent duct 92 by reason of their being warmer and lighter than the atmosphere with which the open upper end of the vent duct 92 communicates. From vent duct 92, the vent gases are discharged into an open bottom draft hood 100, the top of which is tapped by a vent pipe 106 which conducts said gases to a chimney or the like.

The circulating air of the heating system enters the furnace through an intake opening 120, Fig. 13, in the rear wall of the furnace casing, said air coming from the furnace room or the cold air return duct, and being impelled either by natural gravity circulation or by an air fan or blower 122, Fig. 6. Upon entering said intake opening 120, the air passes upwardly between and around the heat convectors, as shown by the arrows in Fig. 1, into the plenum chamber 125 in the top of the furnace and from this chamber, the heated air passes to the rooms to be heated through warm air ducts 18 in the usual manner.

The heat convectors 60, 70 may be made of pressed or cast metal, in two half sections bolted, riveted or otherwise suitably secured together at their peripheries, or they may be made in one piece cored castings, the former method being here shown.

In order to secure the most efficient heat emission, the generally vertically disposed side walls of all convectors are of corrugated form, the corrugations being obliquely inclined, as indicated in the drawings, the inclination thereof being in one direction in one side wall and in a crosswise direction in the opposite side wall of each convector. As here shown, all corrugations in the left hand wall, Figs. 1 and 3, of each convector are slanted or inclined in the same direction and all corrugations in the right hand wall, Figs. 1 and 3, of each convector are slanted or inclined in a crosswise direction. In Fig. 8, there is shown a typical fragmentary section of a corrugated convector side wall, the section being taken at right angles to the direction of the corrugations, as at 8—8, Fig. 6.

These crosswise inclined convector wall corrugations have the effect of directing the air flowing upwardly between convectors either toward the front of the furnace or toward the rear thereof, and as here shown, the corrugations of the left hand walls, Figs. 1 and 3, direct said air rearwardly and the corrugations in the right hand walls direct said air forwardly, all in accordance with their particular inclination. This tends to cause a spiral upward course of the air, as indicated by the arrows in Fig. 1, inducing a turbulence in the vertical air streams and yet not materially retarding air flow, such as would be the case if the corrugations were horizontally disposed.

At those places in the side walls of the auxiliary convectors 70 where the inwardly projecting ridges of the corrugations of opposite walls cross and come nearest each other, suitable cross tie members are inserted to offset any internal pressure, such as that due to internal explosion, for example. These cross tie members may consist of short tie bolts 73, Figs. 2 and 6, or they may be rivets, or, if each convector is cast in one cored piece, they may be integral therewith, in which case they not only add strength to the casting but also assist in the distribution of the molten metal during the casting process.

The convector corrugations, by increasing the section modulus of the convector walls, greatly increase their strength, each corrugation acting as a beam extending from a cross tie to its own end. By this construction, ample strength to resist internal explosion of gases is provided, especially when combined with the explosive pressure relief means hereinafter described.

As clearly shown in Fig. 6, the bottoms of the auxiliary or side convectors 70 are pitched downwardly toward the outlets 71 thereof, said outlets spigotting into the inlet of the transversely disposed vent manifold 80, so that any condensates occurring in the side convectors, by reason of their very high heat extracting efficiency, naturally drain into said vent manifold. The vertically disposed vent duct 92, Fig. 5, also spigots into said transversely disposed vent manifold so that any condensation in said duct will naturally drain thereinto. The vent manifold 80 is thus made a receiver and collector of all condensation occurring in the side or auxiliary heat convectors and in the vertically disposed vent duct 92, such condensation collecting in said manifold at a central low point 86, Figs. 5 and 13, and draining therefrom through a suitable drip opening 87 into a sewer or the like. No joints made by the installer of the present furnace depend for their water tightness on his attention thereto or on his skill or ability in applying proper waterproof cement to such joints.

The joints 62 in the top cross heads between heat convectors (see Fig. 14), which joints are not exposed to water leakage, are simple cup joints, easily made gas-tight by the use of ordinary furnace cement. The joints between the sections of the vent manifold 80 and the bottoms of the joints between the heat convector side walls are exposed to moisture leakage but such joints are factory made joints in which special water-proof cement is used. The joints between the convector side walls, all around their peripheries, are made gas-tight at the factory by inserting cement into the keystone shaped grooves 77 thereof, Fig. 2. Such grooves securely hold the cement, yet the cement is exposed to the circulating air at one edge thereof so that it is thoroughly dry before being subject to heat. Moreover, this exposure of the cement also permits easy inspection thereof and recementing, if and when necessary.

The transversely disposed vent manifold 80 may be cast in one cored casting but preferably consists of a central section 81 (see Fig. 9), as many intermediate sections 82 as may be required, according to how many auxiliary heat convectors 70 are employed at each side of the main heat convector, and end cover sections 83. The intermediate sections 82 are of identical construction but the central section 81 will vary as to its outlet area and as to its distance between the two auxiliary convectors nearest the central or main convector. This distance varies according to how many burners are employed in the burner compartment of the main convector, and this will vary from one burner to four or even more burners. Because of its sectional, and hence extensible, construction, the vent manifold is readily accommodatable to a wide variation in the number of auxiliary convectors employed at each side of the central or main convectors, and independently of this, to variation in the number of burners employed in the burner compartment of the main convector. In this way, a wide range of furnace sizes is secured with a minimum number of vent manifold casting patterns. The joints between the manifold sections are spigot joints, see Fig. 4, and are made water tight at the factory with special water-tight cement or suitable gasket packing. Tie bolts 85, see Fig. 4, at top and bottom serve to securely hold together the manifold sections, including the end cover sections 83.

The weight of the rear half of each heat convector is borne by this transversely disposed vent manifold 80 which acts as a box girder extending across the rear of the furnace, the ends of said manifold resting upon horizontally disposed supporting angle bars 124 suitably secured to the furnace casing side walls which are suitably braced to take this load. Referring to Figs. 6 and 9, it will be noted that the inlets of the vent manifold are in forward extensions thereof and into which the side or auxiliary heat convector outlets 71 fit and upon which they rest. This downward thrust would normally overturn the vent manifold and to prevent this, the end cover sections 83 of the manifold are provided with forwardly projecting extensions 84 which rest upon and engage the manifold supporting angle bars 124.

The purpose of the forwardly extending manifold inlets is to tap the vent gases from the bottom of the side or auxiliary heat convectors so as to draw off therefrom only the heaviest and therefore the coolest gases. Inasmuch as the vent manifold is located rearwardly of the heat convectors, see Fig. 6, the upward flow of the air currents between and around the convectors is not interfered with or disturbed in any way. As shown, the vertically disposed vent duct 92 from the vent manifold outlet is located close to the rear casing panel of the furnace and special provisions are made for conducting the vent gases from the side or auxiliary convectors to the vent manifold outlet in as short and direct a course as possible, the cross area of the vent manifold being of extra liberal size, as will be later referred to.

Referring to Figs. 4 and 6, it will be noted that the vent manifold, rearwardly of each side or auxiliary convector, has a suitable clean-out opening 88, normally securely closed by a cover plate 89. Note also that the inclined outlet openings 71, Fig. 6, of the side or auxiliary convectors permit convenient inspection of the inside lower ends of the side convectors and ready removal therefrom of scale and such crystalline condensates as collect at the bottom of the side convectors when certain types of gaseous fuel are employed, such scale and crystalline condensates being due to the low degree to which the gases in the lower ends of the side convectors are cooled. These clean-out openings 88 are therefore an important part of the present furnace, and the fact that the rear of the vent manifold is flush with the rear wall of the furnace casing makes the clean-out arrangement practical and convenient.

The passageway 110, Figs. 3 and 5, from the upper end of the main convector 60 into the draft hood 100, at the rear of the furnace, is an explosion and gas leakage relief passageway which, being closed during normal furnace operation, need not be more fully referred to at this time.

The draft hood 100 serves the usual functions of a draft hood, the baffle plate 102 thereof deflecting down drafts from the vent duct 92 and by having the draft hood open to atmosphere at its lower end, the upward draft or suction at the vent manifold, at the lower end of the vent duct 92, is limited to that due to the small rise of said vent duct.

It is, of course, important to thoroughly understand certain fundamental principles which govern the rate and distribution of the flow of burned gases in the present furnace structure. The pull due to the short vertical vent duct 92 varies, and, at best, it is barely strong enough to pull the vent gases from the side or auxiliary convector outlets 71. So far as downward pull of the gases in the side convectors is concerned, it may be disregarded.

Usually, in normal operation, the interior of the vent manifold is under slightly greater than atmospheric pressure. The draft pressure, due to rise of the hot gases in the central or main heat convector, is not sufficient ordinarily to overcome friction, force the gases downward through the side or auxiliary convectors and start and maintain a proper draft, were it not for the fact that a gravitational drop of the gases in the side convectors takes place upon their being cooled by heat extraction. The force of the upward draft, due to the rise of the gases in the main convector, serves to distribute the gases laterally through the top cross headers into the upper ends of the side convectors and the tendency is to propel a greater volume of gases into the outer ones of said convectors. This tendency, however, is substantially counterbalanced by the greater resistance to the vent gas flow through the vent manifold to the vent duct 92 from the outer ones of the side convectors than to the vent gas flow through the vent manifold to the vent duct 92 from the inner ones of the side convectors. The downward flow of the gases within the side convectors is caused largely by the gravitational influence of the gases within the side convectors, such gases cooling and hence becoming heavier, and in consequence, gradually sinking to the bottoms of the side convectors. The rate of burned gas flow through each side convector is therefore largely proportional to the relative cooling influence to which each side convector is exposed. If, for instance, in the balanced assembly shown in Fig. 1, wherein there are two auxiliary convectors at each side of the central convector, the warm air ducts connected to the furnace draw more air through the auxiliary convectors on one side of the furnace than on the other, those convectors subjected to greatest air flow and greatest heat extraction will cool and draw through themselves more of the burned gases. Similarly, if there are more auxiliary convectors on one side of the central convector than on the other side thereof, such as in the unbalanced assembly of Fig. 3, the rate of burned gas flow through each convector tends to equalize itself and proportionately more burned gases will flow toward that side of the furnace having more convectors, notwithstanding the fact that the cross-sectional areas of the cross duct passages 61 are the same. The heated air delivered by the various spaces between the side convectors tends to equalize itself in its discharge as to both temperature and velocity. This equalization of air temperature and velocity is further equalized by having wider air spaces between the main convector, which is heated to higher average surface temperature, and the adjacent side convectors, than between the side convectors themselves. The above equality and automatic balancing of heat distribution, based upon my discovery that gravitational influence is an important determinant of the volume of burned gases traversing the side convectors, has been carefully fostered by having the cross head connections 61 at the tops of the convectors of very ample cross-sectional areas and by providing ample cross-sectional area and easy direct gas flow in the vent manifold 80.

Discovery of the foregoing factors enables me to make intermediate sizes of furnaces by having a balanced number of auxiliary or side convectors, as in Fig. 2, or an unbalanced number thereof, as in Fig. 3. For instance, normally I would have a two burner furnace with two auxiliary convectors on each side of the main convector and the next larger size of furnace with three burners would seemingly require three auxiliary convectors on each side of the main convector. By careful proportion of the flues and furnace parts, however, I can provide an intermediate size of furnace having three burners and two auxiliary convectors on one side and three auxiliary convectors on the other side of the main convector. The gas consumption can be made proportional to the total heating surface and notwithstanding the unbalanced distribution of the side convectors, I still can secure substantially uniform air flow into warm air outlet pipes connected anywhere at the top of the furnace.

In connection with furnaces having unbalanced distribution of side convectors, note in Fig. 9 that the air blower 126 is wider than the air blower 127, in order to apportion more air to that side of the furnace having more side convectors and hence more heating surface and air passage area.

Under normal gravity circulation, regardless of the relative number of side convectors employed on each side of the main convector, within reasonable limits, and regardless of any ordinary differences in air flow at various parts of the furnace, if proportioned as herein described, the temperature of the gases in all side convectors will be the same at any given level. At lower levels, the gas temperature will be lower but still alike in all side convectors and all such convectors will discharge vent gases into the vent manifold at substantially the same temperature. The automatic balancing which takes place is a gravitational balance and the venting of the side convectors is a selective process by which only those gases cooled to the lowest possible temperature will escape to the vent ducts.

I will now point out how I secure the highest possible thermal efficiency in the present furnace. Just before the vented gases leave the side convectors, they are exposed to the greatest obtainable heat extracting influence, namely, to that of the incoming cold air blowing up against the bottoms of the side convectors. Likewise, just before the circulating air leaves the passages between side convectors, it is exposed to the greatest obtainable heating influence, namely, to that of the highly heated upper ends of the convectors. The natural downward drop of the burned gases within the side convectors, upon cooling, is in opposed direction to the natural upward flow of the circulating air upon being heated. This opposed circulating principle brings about the highest possible average temperature difference between the convectors and the adjacent upwardly flowing air and, as a result, the greatest possible volume of heat is conveyed into the air per square foot of heating surface. The difference in temperature between the heating surfaces and the air in contact therewith is further decreased by the spiral turbulence of the up-flowing air between the convectors (see Fig. 1), such turbulence being brought about by the obliquely disposed corrugations of the convector side walls. Thus, different and cooler air is constantly brought into contact with the heating surfaces of the convectors, yet the volume and velocity of air traversing the vertical airways between convectors is not materially reduced by the corrugations of said convector side walls. To still further promote the most rapid upward air circulation and the greatest air volume, the heat convectors, as far as possible, are of stream-line design and, as shown in Fig. 13, the cross-sectional areas of the air passages between convectors increases from the lower ends of the convectors to the upper ends thereof, the increase being approximately in proportion to the rate of expansion of the air while being heated.

The features of the present furnace giving safety against internal gas explosion will now be described. Notwithstanding the superior efficiency of gas furnaces employing diving flue circulation of combustion products, such as herein disclosed, they have been objected to because the lighter-than-air gases, from accidentally opened or extinguished main burners and pilots or from burners supposedly but not quite closed by automatic control devices, collect and remain trapped for long periods of time in the upper flues of the furnace. To overcome this objection, I have arranged a direct by-pass passage 110 from the top of the main or central heat convector, in which the furnace burners are located, into the furnace draft hood 100 below the down draft baffle 102 thereof, as clearly shown in Figs. 3 and 5.

Referring now to Figs. 15 to 18 inclusive, it will be noted that a suitable closure 111 is provided for the outlet of this relief passage 110, said closure being pivoted at its upper end on a corrosion-proof pin 103 and being preferably provided on its inner surface with suitable packing material 112. This relief closure has a lug 113 extending from one side thereof, see Fig. 18, and to this lug one end of a thermostatic metal band 114 is riveted or otherwise suitably secured. When heated by vent gases passing through the draft hood 100, to which gases said band is exposed, the thermo-metal of the band bends it to the position shown in Fig. 15, with consequent movement by gravity of the relief closure to closing position, inasmuch as its pivot pin 103 is located inwardly, as shown, from its central gravity plane. Should the vent gases flowing through the draft hood cool, either due to turning off or accidental extinguishment of the furnace burners, the thermostatic band will bend inwardly toward the front of the furnace, as shown in Fig. 16, and in so doing, will engage an adjustable stud or lift pin 115 with consequent pushing of the relief closure partly open, as shown in Fig. 16. Any lighter-than-air gases which may collect at the top of the main convector or at the tops of the cross connected side convectors, therefore, will be vented from such convectors and will pass into the draft hood and out through its top outlet to the chimney.

When the furnace burners are again turned on, the hot gases, as soon as they reach the upper end of the main convector, escape through the now open relief passage 110 and in so doing strike the thermo-metal band 114 on their way to the chimney. The high heat of said gases promptly causes the thermo-metal band to bend outwardly, as in Fig. 15, permitting the relief closure to close by gravity and such closed position of said gate is maintained by the hot vent gases coming up into the draft hood from the vertical vent duct 92. The relief closure, therefore, remains in closed position, out of contact with the lift pin 115, as long as the main burners are on and hot gases are flowing through the draft hood as the result thereof.

The proportions of the parts, especially those of the thermo-metal band 114, and the adjustment provided at the lift pin 115, may be such that any desired position of the relief closure relative to the volume of gas being burned may be secured. For instance, the relief gate may be cracked or opened but slightly when only the pilot burner is on but closed as soon as any gas is burned by one of the main burners.

It is to be noted that the thermo-metal band 114 is exposed to the highly heated gases escaping through the relief passage 110 only for very brief periods, inasmuch as it will close the relief closure before it (the band) can become excessively heated. No work or strain is imposed upon the thermo-metal band, therefore, except when it is cool or almost cool. When it is heated, it is out of contact with the lift pin 115 and therefore quite free to assume its normal, outwardly bent position in accordance with the temperature of the vent gases to which it is exposed. The thermo-metal band, for adjustment, etc., is always accessible through the open bottom of the draft hood, and inasmuch as said band is constantly under varying temperature, it will effect frequent movements of the relief closure and thus effectively prevent sticking of said closure.

It is to be noted also that the relief passage is located below the down draft diverting baffle 102 so that any chimney down draft occurring while the relief passage is open, as for instance while only a pilot flame is burning in the furnace, cannot cause extinguishment of said flame or interference with the venting of the furnace when cold.

It is to be clearly understood that the function of the above described automatic opening of the relief closure while the furnace is cold is not for the purpose of starting a circulation in the furnace or of performing any such function as a by-pass damper to aid in the operation of the furnace. Such aids are not needed in the slightest degree in the present furnace and the described operation of the relief passage would not prove effective for such purposes if they were so needed. The extent of opening of the relief passage is sufficient to drain off or vent and thereby prevent any considerable accumulation of explosive gas and air mixtures within the convectors of the furnace and to continuously drain off or vent gases which originate from leaky valves and the like. A thermostatic safety pilot is provided to prevent long continued accidental gas flow into the heat convectors in any extensive volume. Another function of my thermostatic relief passage is to drain off combustion products when only a small pilot flame is in operation, which combustion products might otherwise fill the convectors with carbon dioxide and smother the flame under certain conditions.

The relief passage and its closure have still another function and that is to act as an automatic safety pressure release in case of internal explosion of gases. Research work upon the present furnace structure by exploding various mixtures of gases placed into the convectors indicates that the gravity hung fire door 47 at the front of the furnace acts as an effective means to relieve the pressure of an explosion from the main convector to an extent sufficient to prevent damage thereto. The vent manifold and its outlet and probably other causes seem to prevent formation of destructive pressures at the lower ends of the side convectors. To similarly relieve pressures due to internal explosion occurring at the upper ends of the side convectors, the relief passage 110 is provided, being connected directly to the upper end of the main convector so as to be able to successfully relieve excessive explosive pressures at the top ends of the side convectors through the top cross passages 61 as well as at the top end of the main convector.

An internal explosion always originates in the vicinity of the main burner or burners, the pilot burner or burners or the fire door. Such an explosion will instantly fling the fire door open and the conflagration and pressure wave, travelling upwardly, promptly flings the relief closure 111 wide open, thereby permitting immediate escape of unburned and burning gases and relieving the compression of the exploding mixture. The sudden force and the rapidity of the explosion are thus effectively reduced, with consequent reduction of the internal pressure to such a great extent that the convectors can be designed to resist such explosive force without the necessity of excessive metal thickness.

Heretofore, explosion relief doors have been so arranged that the explosion was vented into the interior of the furnace casing. My method of venting an explosion into an open bottom draft hood arranged as herein shown and described is a material improvement over anything else of this kind heretofore attempted.

Referring to Fig. 17, it will be noted that when the relief closure 111 flies open, it will strike the down draft baffle 102. Ordinarily, it would displace or damage this baffle, putting it out of service, and to avoid this, said baffle 102 is hinged at its top and drops by gravity to its normal operating angle as shown in Fig. 19, at which angle it is held by some such stop means as the lug 104. After the explosion, the relief closure 111 will drop by gravity to its normal working position and the baffle plate 102 will similarly drop downward. The thermo-metal band 114 will not necessarily be damaged in anyway inasmuch as it is fairly thick and swings upwardly out of the way along with the relief closure. The escaping and generally burning gases will strike the outer, downwardly inclined wall of the draft hood and will be deflected downwardly thereby, thus tending to prevent ignition of flammable surroundings. The flange 116 of the relief passage conduit serves to securely hold the draft hood from being blown outwardly by an explosion, such flange being preferably secured by bolts 117 through the inner wall of the draft hood and the back wall of the furnace casing (Fig. 19). When the relief gate is flung open by an explosion, it causes the baffle plate 102 to close the outlet 105 of the draft hood into the smoke pipe 106 connected thereto and this tends to prevent spread of the explosion into and hence damage of the vent pipe, inasmuch as the draft hood outlet will usually be closed a fraction of a second ahead of the emission of flaming gas from the relief passage 110. The described combination of (first), means to prevent or at least reduce accumulation of explosive gas mixtures within the heat convectors and (second), means to reduce the severity of an explosion should it occur, by relieving the pressure at a point approximately half-way between the fire door relief means and the vent exits 71 of the side convectors constitute important and effective safety features.

Modern gas furnaces are placed under automatic thermostatic control and with the coming of forced air circulation and conditioning of the circulated air, the tendency is to add additional control devices. Usually these control devices are placed around the outside of the furnace and are thus exposed to dust, damage and tampering. Furthermore, the numerous control devices placed around a furnace in this manner give the installation a messy and unworkman-like appearance.

To place the furnace controls into a protected, out-of-sight but readily accessible location, I provide a control chamber 20 at the front of the furnace and at the base thereof, the heat convectors being located at the level shown and the air deflectors 123 being so arranged (see Figs. 5 and 6) that their angle of discharge delivers air from the front to the back of the convector heating surfaces, notwithstanding the fact that the front deflector is moved back to provide space for said control chamber. As here shown, said control chamber comprises a box-like structure extending from one side of the furnace to the other, the front wall of said chamber being in the form of a removable panel or door 24.

Fig. 12 is a front elevation of the furnace with the control chamber front panel or door 24 removed and showing the most essential control units of the furnace, namely, a gas inlet conduit 30, a gas pressure governor 31, a gas supply tube 32 to a safety pilot burner 33, and an electrically operated main gas valve 34. The gas supply conduit is continued horizontally through the control chamber as shown and is then passed vertically upward at 35 to a horizontally disposed pipe 36 which conducts the gas into the burner cock manifold 37 to which burner cocks 38 are suitably connected. The vertically disposed gas supply pipe 35, for convenience, may be placed outside of the control chamber and furnace casing, as shown, or, if desired, it may be placed inside thereof.

Preferably, removable casing end plates 26 and 27 are provided at the ends of the control chamber and by removing one or both of said plates, the assembled control manifold may be readily inserted into or removed from the control chamber.

As will be noted from Fig. 5, the front air deflector plate 123 protects the control chamber from heat radiation, and this is important as the oiled leather diaphragm (not shown) of the gas pressure governor 31 must be kept in a relatively cool condition. It is desirable also to ventilate the control chamber to prevent accumulation of gases seeping out at joints, valve glands and the like, and this can be done by providing louvered or other suitable openings, as at 25, in the control chamber front panel 24. Inasmuch as this would result in the passage into the furnace room of any gas leakage in the control chamber, I provide said control chamber with an outlet 40 communicating directly with the burner compartment 55 located directly above said outlet. As the burners, during operation thereof, constantly draw air through the outlet 40 of the control chamber, continuous ventilation of said chamber is effected, the openings 25 in the control chamber front wall 24 being used for inlet purposes only. Any leaks from the gas control manifold system in the control chamber, therefore, will be vented through the furnace flues to the chimney. When the main burners are on, the control chamber will be vented to the chimney through the vent manifold 80 and vent duct 92, and when said burners are off or their flames accidentally extinguished, said control chamber will be vented to the chimney through the safety by-pass 110 which will then be open, as was heretofore pointed out.

The assembly of the furnace structure, including its enclosing casing, will now be described. As clearly shown, the furnace casing is horizontally separable, an I-shaped frame 128 forming a junction piece between an upper casing portion and a lower casing portion or base. The base or lower portion of the furnace is strongly constructed so as to be able to securely support the heat convectors, the control chamber box being especially strongly braced below the main or central heat convector by the frame 28 and otherwise. As shown in Fig. 5, the main convector is fitted and bolted to a front frame 45 having a bottom wall 46 resting securely upon the control chamber box, and the front frame 45 is also bolted to the front panel of the casing base which prevents the main convector from overturning during assembly thereof. The rear end of the main convector is temporarily supported during its erection by a pipe leg 67, the upper end of which slips into a vertical hole in a cross frame 66 which is secured to the main convector, the weight of said convector being borne by a nut 68 on said pipe leg.

The side heat convectors rest upon the vent manifold 80 at the rear, as has been described, and at the front, having supporting lug extensions 74 which rest upon a cross angle bar 75, Figs. 3, 5 and 6. This cross angle bar 75 is supported at each end in castings 76 suitably secured to the side panels of the casing base, as shown in Figs. 6 and 9, and the center of this angle bar rests upon the front frame 45, as shown in Fig. 5. The nut 68 of pipe leg 67 is then adjusted to align the convector wall joints 62, which are cemented cup joints, firmly secured together by means of short tie bolts 64, Fig. 14, passing through lugs 63 (see also Figs. 5 and 6). After all side convectors are bolted in place, the nut 68 of pipe leg 67 is released so that the weight of the rear end of the main convector is suspended from the cross conduits 61. In use, the main convector has a higher temperature than the side convectors and it therefore expands more, vertically about .02 inch but the above described supporting means for said main convector is of sufficient flexibility to readily accommodate itself to such expansion.

The rear inlet frame of the casing base supports no weight but is strongly braced laterally to remain in rectilinear alignment, as shown in Fig. 13, in which view 129 represents vertical end braces and 130 represents top and bottom structural cross angle bars, said bars being recessed into and securely bolted to the end braces. The end braces also support the ends of the angle bar 124 which supports the transversely disposed vent manifold 80. A large and unrestricted inlet 120 is thus provided for cold air entry into the furnace casing. Any desirable arrangement of air blowers or fans may be employed, the arrangement thereof shown in Fig. 6 being representative.

In modern gas furnaces, air humidifying means are regarded as essential and the combination of a convector containing one or more burners with a water evaporating pan 140 on top of said convector, its bottom being in intimate contact with said convector and subjected to the heat rising directly from the burner or burners therein, as shown in Figs. 1 and 5, is part of my invention. As shown in Fig. 5, at the front end of the water pan I place a framed opening 142 in the casing and through this opening the pan projects. Flanges 143 carried by the front end of said pan effectively close said opening when the pan is slid into place and screws 144 extending through the pan flanges 143 and the casing front wall hold said pan securely. Any suitable means of water supply 145 may be employed for supplying said pan with water. By the arrangement shown, which is intimately associated with the parallel convector principle of this furnace, the water pan may be easily withdrawn for inspection, cleaning or the like.

I have described the free and unrestricted circulation which I provide through the convectors of this furnace structure and have explained the reasons therefor. Sometimes, there is a tendency for the draft to be too free and hence for a larger surplus of secondary air to be drawn into the combustion or burner chamber 55. In such cases, I find that the rate of secondary air supplied to the burners is best controlled in this furnace by reducing the area of the secondary air supply openings adjacent the burners. As shown in Figs. 9, 10 and 11, I provide very narrow air slots 51 all around the periphery of each burner, which burners are of usual furnace type embodying two parallel cored channels 54. Between these channels, I provide narrow center strips cast integrally with the burner casting, and on each side of these narrow strips there are very narrow air inlet slots 53. All the above described air slots have their top edges approximately flush with the top of the burners and the air enters in a flat vertical sheet parallel to the gas flames, and said flames draw the air toward and around them. To provide these slots in proper relationship to the burner, I find it preferable to provide shelves or projections 58 on the side walls of the combustion chamber and to provide vertically disposed division plates 57 between the burners. I find further that by this narrow slot construction, I secure a markedly shorter flame and more even flame length and proper combustion from one end of each burner to the other. I am able also to reduce the surplus air supplied to the burners to a smaller percentage than by the usual construction, without impairing proper combustion.

Because of variation in different gases in various cities and because of limitations in making castings, I find I cannot completely govern the secondary air supply by the width of the air slots. Therefore, I provide other auxiliary means for controlling the air supply, and favor a hinged baffle plate 41, Fig. 5, which reduces the secondary air supply at the air intake and yet properly directs the air flow. As will be noted in Fig. 10, the burners are really located at the top of individual compartments, each of which has its own individual air intake opening 40.

Further features of the present invention will be apparent to those skilled in the art to which it relates.

What I claim is:

1. In a furnace, a plurality of chambered heat convectors adapted to have heated products of combustion flow through the chambers thereof, said convectors being generally vertically disposed and being arranged in spaced relation to provide therebetween passageways for the air to be heated by such convectors, said convectors having their air heating side walls obliquely corrugated, with the adjacent corrugations of adjacent convectors extending in generally crosswise directions.

2. In a furnace, a plurality of chambered heat convectors adapted to have heated products of combustion flow through the chambers thereof, said convectors being generally vertically disposed and being arranged in spaced relation to provide therebetween passageways for the air to be heated by said convectors, each of said convectors having its air heating side walls obliquely corrugated, with all of the corrugations of one of its side walls extending in the same direction and with all of the corrugations of its opposite side walls extending in a generally crosswise direction.

3. In a furnace, a plurality of chambered heat convectors adapted to have heated products of combustion flow through the chambers thereof, said convectors being generally vertically disposed and being arranged in spaced relation to provide therebetween passageways for the air to be heated by said convectors, each of said convectors having its air heating side walls obliquely corrugated, with all of the corrugations of one of its side walls extending in the same direction and with all of the corrugations of its opposite side wall extending in a generally crosswise direction, the adjacent corrugations of adjacent convectors extending in generally crosswise directions.

4. In a furnace, a plurality of chambered heat convectors adapted to have heated products of combustion flow through the chambers thereof, said convectors being generally vertically disposed and being arranged in spaced relation to provide therebetween passageways for the air to be heated by said convectors, said convectors having their air heating side walls corrugated, with the corrugations of all side walls which face in one direction slanting upwardly toward the front ends of the convectors and with the corrugations of all the side walls which face in the opposite direction slanting downwardly toward the front ends of said convectors.

5. In a furnace, means for transferring heat from one circulating medium to another, said means comprising a plurality of chambered heat convectors adapted to have one of said mediums circulate through the chambers thereof, said convectors being arranged in spaced relation to provide therebetween passageways for the circulation of the other medium, the side walls of said convectors being obliquely corrugated, with the corrugations of adjacent side walls of adjacent convectors extending in generally crosswise directions.

6. In a furnace, means for transferring heat from one circulating medium to another, said means comprising a plurality of chambered heat convectors adapted to have one of said mediums circulate through the chambers thereof, said convectors being arranged in spaced relation to provide therebetween passageways for the circulation of the other medium, said mediums circulating in opposite directions, the side walls of said convectors being obliquely corrugated, with the corrugations of adjacent side walls of adjacent convectors extending in generally crosswise directions.

7. In a furnace, a plurality of vertically disposed chambered heat convectors, means adapted to supply products of combustion to the upper ends of the chambers of said convectors, means adapted to effect a downward flow through said chambers of the products of combustion supplied to the upper ends thereof, each of said chambers being of progressively greater cross-sectional size from the upper end thereof to the lower end thereof, said convectors being arranged in parallel spaced relation to provide therebetween passageways for the upward flow of air to be heated, said passageways being of progressively greater cross-sectional size from the lower ends of said convectors to the upper ends thereof.

OTTO J. KUENHOLD.